US009527152B2

(12) United States Patent
Hutchison et al.

(10) Patent No.: US 9,527,152 B2
(45) Date of Patent: Dec. 27, 2016

(54) ROOT PASS WELDING SOLUTION (71) Applicant: Illinois Tool Works Inc., Glenview, IL (US)

(72) Inventors: Richard Martin Hutchison, Iola, WI (US); Mario Anthony Amata, Dublin, OH (US); Michael Scott Bertram, Troy, OH (US); Zhigang Xiao, Washington Township, OH (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 685 days.

(21) Appl. No.: 13/837,578

(22) Filed: Mar. 15, 2013

(65) Prior Publication Data
US 2014/0027426 A1 Jan. 30, 2014

Related U.S. Application Data (60) Provisional application No. 61/677,143, filed on Jul. 30, 2012.

(51) Int. Cl.
| | | |
|---|---|---|
| *B23K 9/10* | (2006.01) | |
| *B23K 9/09* | (2006.01) | |
| *B23K 35/02* | (2006.01) | |
| *B23K 35/40* | (2006.01) | |
| *B23K 35/22* | (2006.01) | |

(Continued)

(52) U.S. Cl.
CPC ............. *B23K 9/09* (2013.01); *B23K 9/0286* (2013.01); *B23K 33/006* (2013.01); *B23K 35/0244* (2013.01); *B23K 35/0261* (2013.01); *B23K 35/22* (2013.01); *B23K 35/362* (2013.01); *B23K 35/3602* (2013.01); *B23K 35/3606* (2013.01); *B23K 35/3607* (2013.01);
(Continued)

(58) Field of Classification Search
CPC ............. B23K 33/006; B23K 35/0244; B23K 35/0261; B23K 35/22; B23K 35/3602; B23K 35/3606; B23K 35/3607; B23K 35/3608; B23K 35/362; B23K 35/368; B23K 35/406; B23K 9/0286; B23K 9/09
USPC ............ 219/73, 73.1, 73.11, 73.2, 73.21, 74, 219/130.5, 146.1; 432/13
See application file for complete search history.

(56) References Cited

U.S. PATENT DOCUMENTS

| | | | |
|---|---|---|---|
| 3,177,340 A | * 4/1965 | Danhier | ............. B23K 35/3053 219/146.3 |
| 3,767,891 A | 10/1973 | Haverstraw | |

(Continued)

FOREIGN PATENT DOCUMENTS

| | | |
|---|---|---|
| EP | 0508439 | 10/1992 |
| EP | 1008417 | 6/2000 |

(Continued)

OTHER PUBLICATIONS

International Search Report from PCT application No. PCT/US2013/052387, dated Jul. 16, 2014, 19 pgs.

*Primary Examiner* — Dana Ross
*Assistant Examiner* — Joseph Iskra
(74) *Attorney, Agent, or Firm* — Fletcher Yoder P.C.

(57) ABSTRACT

The present systems and methods relate generally to the field of welding systems, and particularly to flux-cored arc welding systems with self-shielded electrodes (FCAW-S). In an embodiment, a tubular welding wire includes a core and a sheath disposed around the core. Further, the tubular welding wire includes greater than approximately 2.4% glassy slag promoter by weight.

19 Claims, 6 Drawing Sheets

(51) Int. Cl.
  *B23K 35/36* (2006.01)
  *B23K 35/362* (2006.01)
  *B23K 35/368* (2006.01)
  *B23K 9/028* (2006.01)
  *B23K 33/00* (2006.01)

(52) U.S. Cl.
  CPC ........ *B23K 35/3608* (2013.01); *B23K 35/368* (2013.01); *B23K 35/406* (2013.01)

(56) References Cited

U.S. PATENT DOCUMENTS

| | | | |
|---|---|---|---|
| 3,805,016 A | 4/1974 | Soejima | |
| 4,186,293 A | 1/1980 | Gonzalez et al. | |
| 4,305,197 A | 12/1981 | Puschner et al. | |
| 4,379,811 A | 4/1983 | Puschner et al. | |
| 4,584,459 A | 4/1986 | Merrick et al. | |
| 5,365,036 A | 11/1994 | Crockett et al. | |
| 5,525,163 A * | 6/1996 | Conaway | B23K 35/3605 148/23 |
| 5,758,834 A | 6/1998 | Dragoo et al. | |
| 5,824,992 A | 10/1998 | Nagarajan et al. | |
| 5,857,141 A | 1/1999 | Keegan et al. | |
| 5,961,863 A | 10/1999 | Stava | |
| 6,051,810 A | 4/2000 | Stava | |
| 6,093,906 A | 7/2000 | Nicholson et al. | |
| 6,137,081 A | 10/2000 | Blankenship et al. | |
| 6,160,241 A | 12/2000 | Stava et al. | |
| 6,204,478 B1 | 3/2001 | Nicholson et al. | |
| 6,215,100 B1 | 4/2001 | Stava | |
| 6,274,845 B1 | 8/2001 | Stava et al. | |
| 6,608,284 B1 | 8/2003 | Nikodym | |
| 6,723,954 B2 | 4/2004 | Nikodym et al. | |
| 6,784,401 B2 | 8/2004 | North et al. | |
| 6,787,736 B1 | 9/2004 | Chen et al. | |
| 6,835,913 B2 | 12/2004 | Duncan et al. | |
| 6,855,913 B2 | 2/2005 | Nikodym | |
| 6,933,468 B2 | 8/2005 | Keegan et al. | |
| 6,939,413 B2 | 9/2005 | Crockett | |
| 7,017,742 B2 | 3/2006 | Dragoo et al. | |
| 7,147,725 B2 | 12/2006 | Dallam et al. | |
| 7,152,735 B2 | 12/2006 | Dragoo et al. | |
| 7,166,817 B2 | 1/2007 | Stava et al. | |
| 7,194,447 B2 | 3/2007 | Harvey et al. | |
| 7,300,528 B2 | 11/2007 | Crockett | |
| 7,358,459 B2 | 4/2008 | Stava | |
| 7,397,015 B2 | 7/2008 | Peters | |
| 7,812,284 B2 | 10/2010 | Narayanan et al. | |
| 7,829,820 B2 | 11/2010 | Karogal et al. | |
| 7,842,903 B2 | 11/2010 | Myers | |
| 7,863,538 B2 | 1/2011 | Barhorst et al. | |
| 7,884,305 B2 | 2/2011 | Soltis et al. | |
| 7,989,732 B2 | 8/2011 | Karogal et al. | |
| 2004/0187961 A1 | 9/2004 | Crockett | |
| 2005/0121110 A1 | 6/2005 | Dallam et al. | |
| 2005/0127132 A1 | 6/2005 | Crockett | |
| 2005/0236374 A1 | 10/2005 | Blankenship | |
| 2005/0242076 A1 | 11/2005 | Stava et al. | |
| 2006/0081579 A1 | 4/2006 | Kotecki | |
| 2006/0096966 A1 * | 5/2006 | Munz | B23K 35/0266 219/145.22 |
| 2006/0144836 A1 | 7/2006 | Karogal et al. | |
| 2006/0186103 A1 | 8/2006 | Rajan | |
| 2006/0196919 A1 | 9/2006 | James et al. | |
| 2006/0207984 A1 | 9/2006 | Karogal | |
| 2006/0219684 A1 | 10/2006 | Katiyar | |
| 2006/0219685 A1 | 10/2006 | Karogal et al. | |
| 2006/0226138 A1 | 10/2006 | James et al. | |
| 2006/0261053 A1 | 11/2006 | Karogal | |
| 2006/0261054 A1 | 11/2006 | Katiyar | |
| 2006/0266794 A1 | 11/2006 | Melfi et al. | |
| 2006/0266799 A1 | 11/2006 | Singh et al. | |
| 2006/0273077 A1 | 12/2006 | Soltis et al. | |
| 2006/0283848 A1 | 12/2006 | Karogal et al. | |
| 2007/0012673 A1 | 1/2007 | Narayanan et al. | |
| 2007/0051702 A1 * | 3/2007 | James | B23K 9/186 219/73 |
| 2007/0095807 A1 | 5/2007 | Myers | |
| 2007/0108174 A1 | 5/2007 | Narayanan et al. | |
| 2007/0181549 A1 | 8/2007 | Hartman et al. | |
| 2007/0221643 A1 | 9/2007 | Narayanan et al. | |
| 2007/0241087 A1 | 10/2007 | Peters | |
| 2008/0011731 A1 | 1/2008 | Kapoor et al. | |
| 2009/0045172 A1 | 2/2009 | Van Erk | |
| 2009/0242536 A1 | 10/2009 | Nagashima | |
| 2011/0198317 A1 | 8/2011 | Lin | |
| 2012/0241432 A1 * | 9/2012 | Lin | B23K 35/3602 219/145.22 |
| 2013/0270248 A1 * | 10/2013 | Barhorst | B23K 35/368 219/146.31 |

FOREIGN PATENT DOCUMENTS

| | | |
|---|---|---|
| EP | 1036627 | 9/2000 |
| EP | 1294522 A1 | 3/2003 |
| JP | S62248597 | 10/1987 |
| JP | H02207996 | 8/1990 |
| JP | H04162989 | 6/1992 |
| JP | H0669634 | 9/1994 |
| JP | 2003019594 | 1/2003 |
| RU | 1834139 | 4/1995 |
| SU | 1567346 | 5/1990 |
| WO | 2004024386 A1 | 3/2004 |
| WO | 2011103012 A1 | 8/2011 |
| WO | 2013158590 | 10/2013 |

* cited by examiner

ROOT PASS WELDING SOLUTION

CROSS-REFERENCE TO RELATED APPLICATION

This application claims priority to and the benefit of U.S. Provisional Application Ser. No. 61/677,143, entitled "ROOT PASS WELDING SOLUTION," filed Jul. 30, 2012, which is hereby incorporated by reference in its entirety for all purposes.

BACKGROUND

The present systems and methods relate generally to the field of welding systems, and particularly to flux-cored arc welding systems with self-shielded electrodes (FCAW-S).

Welding is a process that has become ubiquitous in various industries for a variety of applications. For example, welding is often used in applications such as shipbuilding, offshore platform, construction, pipe mills, and so forth. Arc welding systems generally apply electrical current to an electrode to form an arc between the electrode and a workpiece, thereby forming a weld deposit on the workpiece. In general, the electrode may be a continuous, welding wire that is advanced the welding system to reach the workpiece. Further, the chemical composition and physical state of the components of the welding wire may significantly affect the quality of the weld.

During flux-cored arc welding (FCAW), for example, as the electrode and the workpiece are heated by the arc, a portion of the electrode and a portion of the workpiece may melt and mix to form a weld deposit. For certain welding applications, the parts of the workpiece being welded together may be set a distance apart. By specific example, during root pass welding of a pipe, the root pass weld may fuse portions of the pipe together across the root opening; however, the root opening adds complexity to the welding process. For example, during root pass welding, a backing may be used to support the molten material in the root opening during the welding operation, which may increase the cost and time associated with each weld operation. Additionally, during root pass welding, a shielding gas may be used to displace the ambient environment surrounding the molten weld deposit to improve the properties of the weld deposit (e.g., limiting porosity and embrittlement). However, using a shielding gas increases the weight, complexity, and cost of the welding system.

BRIEF DESCRIPTION

In an embodiment, a tubular welding wire includes a core and a sheath disposed around the core. Further, the tubular welding wire includes greater than approximately 2.4% glassy slag promoter by weight.

In another embodiment, a method of manufacturing a welding electrode includes providing a granular core, wherein providing the granular core includes mixing a first agglomerate and a second agglomerate with a glassy slag promoter. The method further includes disposing the granular core within a metallic sheath to form the welding electrode, wherein the welding electrode comprises greater than approximately 2.4% glassy slag promoter by weight.

In another embodiment, a welding method includes feeding a welding wire into a welding apparatus and forming a weld deposit of at least part of the welding wire on a workpiece in a short circuit transfer mode. The method further includes supplying current to the welding apparatus in a plurality of phases. The plurality of phases includes a ball phase configured to form a molten ball at an end of the welding wire and to push a weld pool into the workpiece by increasing the current to a first current level.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As set forth above, during root pass welding, the root opening introduces complexity to the welding process. For example, during typical root pass welding, a backing may be used to support the molten material in the root opening during the welding operation and a shielding gas may be used to displace the ambient environment surrounding the molten weld deposit. However, as mentioned above, the use of a backing and/or shielding gas adds complexity, weight, and cost to the welding system and the welding operation.

As such, present embodiments include tubular welding wires that may generally improve root pass welding via the elimination of the backing, the shielding gas, or both, from root pass welding operations and/or other similar welding operations. Accordingly, the presently disclosed tubular welding wire embodiments include a number of components that generally alter the welding process and/or the properties of the resulting weld. For example, in certain embodiments, one or more components of the tubular welding wire may provide a shielding atmosphere near the welding arc when heated, affect the transfer properties of the welding arc, deoxidize and/or denitrify the surface of the workpiece, and/or other desirable effects. Further, certain components of the self-shielding tubular welding wire, such as certain oxides (e.g., silicon dioxide) may be configured to positively reinforce the weld pool during the welding operation, enabling certain embodiments of the presently disclosed tubular welding wire to perform open root pass welds without a backing.

Accordingly, presently disclosed welding system and method embodiments enable a self-shielding flux-cored arc welding system (FCAW-S) to perform open root pass welding without a backing and/or without an external shielding gas supply. As such, the disclosed FCAW-S welding system embodiments may be less complex, lighter in weight, and/or have a lower cost than a welding system utilizing an external shielding gas supply. Furthermore, it may be appreciated that, in addition to the features provided by the welding wire, it may be desirable for the welding process of the welding system to have certain characteristics as well. For example, embodiments of the presently disclosed welding system may be configured to use a short circuit transfer mode (e.g., Regulated Metal Deposition mode, RMD™) that provides full control of the current for the duration of the welding operation (e.g., to control the deposition of a portion of the welding wire on the workpiece). For example, in certain embodiments, using the aforementioned current control, the welding system may be configured to deposit the weld metal in a droplet or fine droplet short circuit transfer mode with a relatively low spatter rate. Further, in certain embodiments, as set forth in detail below, the current may be reduced immediately prior to clearing the short circuit to reduce the spatter produced by the arc after clearance.

Figures 1, 2:
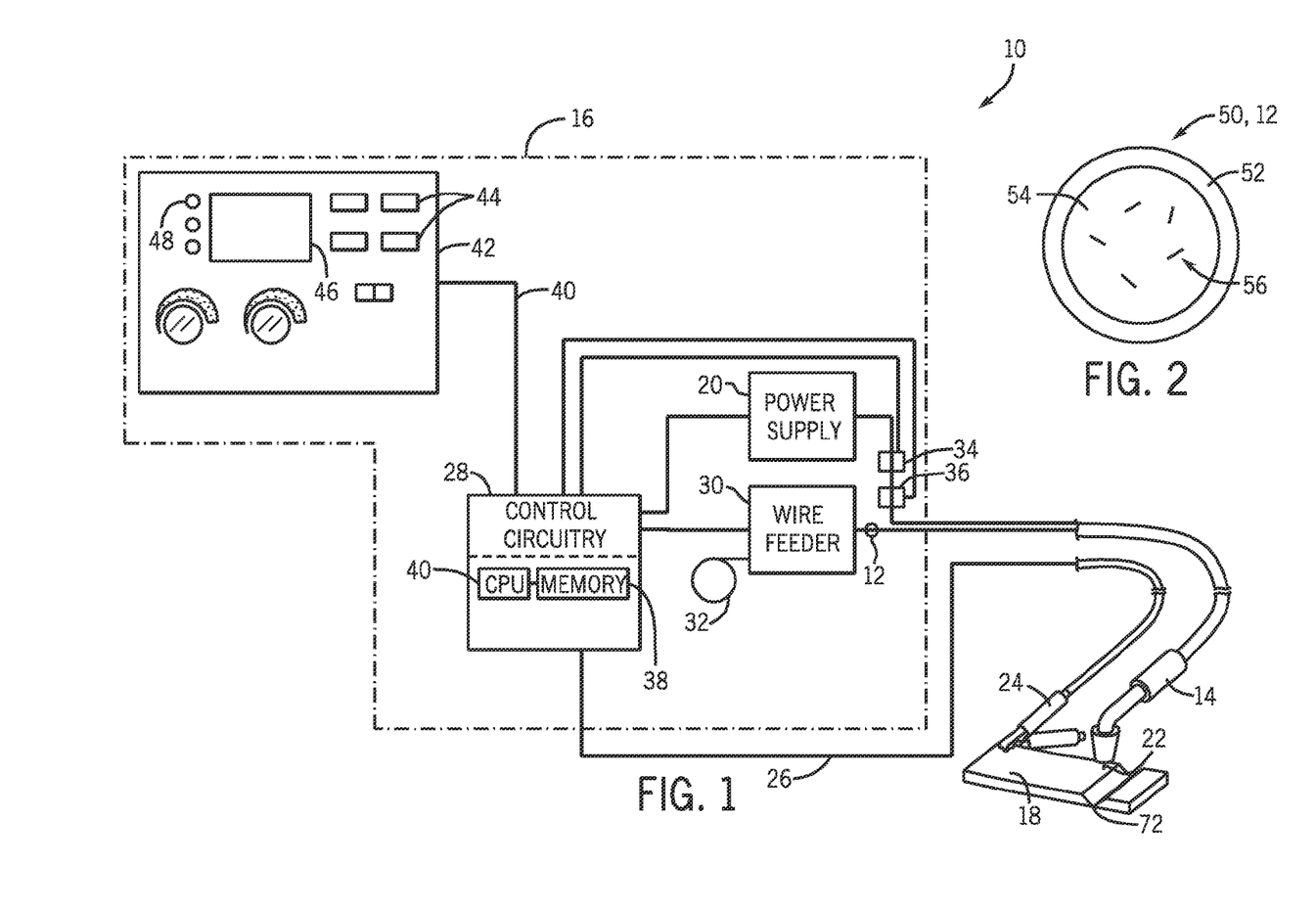
FIG. 1 is a block diagram of a welding system having control circuitry and a wire feeder, in accordance with aspects of the present disclosure.
FIG. 2 is a cross-sectional view of a tubular welding wire, in accordance with embodiments of the present disclosure.

With the foregoing in mind, FIG. 1 is a block diagram of a welding system 10 configured to supply a tubular welding wire 12 (discussed in detail below) to a welding torch 14. In the illustrated embodiment, the welding system 10 is a FCAW-S welding system; however, the present approach may afford certain benefits to other types of welding systems (e.g., GMAW, SAW, or other similar welding systems). The welding system 10 includes a base unit 16 operably coupled to the welding torch 14. Placement of the welding torch 14 proximate to a workpiece 18 (e.g., pipe joint) allows an electrical current, supplied by a power supply 20, to form an arc 22 from the tubular welding wire 12 (e.g., the welding electrode) to the workpiece 18. The arc 22 completes an electrical circuit from the power supply 20 to the tubular welding wire 12, to the workpiece 18, then back to ground via a ground clamp 24 and a ground cable 26. The ground cable 26 may be operably coupled to the power supply 20 through control circuitry 28. The heat produced by the arc 22 may cause the tubular welding wire 12 and/or workpiece 18 to transition to a molten state (e.g., weld pool), facilitating the welding operation.

The base unit 16 powers, controls, and supplies consumables to the welding torch 14 for a welding application. The wire feeder 30 supplies the tubular welding wire 12 from an electrode supply 32 (e.g., spool) to the torch 14. The power supply 20 may include circuit elements (e.g., transformers, rectifiers, switches, and so forth) capable of converting AC input power to a direct current electrode positive (DCEP) output, direct current electrode negative (DCEN) output, DC variable polarity, pulsed DC, or a variable balance (e.g., balanced or unbalanced) AC output, as dictated by the demands of the welding system 10. In some embodiments, the power supply 20 may be a constant current power source.

It should be appreciated that the presently disclosed base unit 16 may enable improvements when performing an open root welding process. For example, to precisely control the deposition of molten material from the tubular welding wire 12 onto the workpiece 18 (e.g., joint 72), the control circuitry 28 controls the power supply 20 and the wire feeder 28. The control circuitry 28 may control the power supplied to the welding torch 14 by adjusting the voltage and current waveforms supplied to the welding torch 14. In certain embodiments, the control circuitry 28 may control the power supply 20 to supply power to the welding torch 14 at a desired power level through a series phases, which may define the transfer mode (e.g., a droplet or small droplet transfer mode) of the tubular welding wire 12. The power supply 20 may provide the desired power level to the welding torch 14 by rapidly adjusting the current and voltage supplied to the torch 14. The control circuitry 28 may monitor the supply voltage and current with a voltage sensor 34 and a current sensor 36.

By varying the voltage and current supplied to the welding torch 14 illustrated in FIG. 1, the control circuitry 28 may control the intensity of the arc 22 and, accordingly, the manner in which the molten material from the tubular welding wire 12 is deposited onto the workpiece 18. In an embodiment, the control circuitry 28 may vary the power supplied to the welding torch 14 according to a predetermined algorithm stored in a memory 38 and executed by a processor 40. In some embodiments, the memory 38 may be any suitable article of manufacture that includes one or more tangible, computer-readable media at least collectively storing data and instructions in the form of programs, applications, modules, routines, and so forth. For example, the memory 38 may include read-only memory (ROM), random access memory (RAM), magnetic storage memory, optical storage memory, or any combination thereof. The processor 40 may be configured to execute instructions stored in the memory 38. The processor 40 may further be configured to process signals from the voltage and current sensors 34, 36 to determine the phase of the transfer mode. In certain embodiments, the processor 40 may be configured to predict clearance of a short circuit between the tubular welding wire 12 and the workpiece 18. It may be appreciated that predicting the short circuit and clearance of the short circuit enables the control circuitry 28 to reduce spatter by reducing the current prior to clearance.

As illustrated in FIG. 1, the control circuitry 28 may be coupled to an operator interface 42. The operator interface 42 may include input devices 44 (e.g., dials, buttons, switches, and so forth) configured to provide for operator adjustment of the base unit 16. For example, input devices 44 such as dials may enable operator adjustment based on properties (e.g., size, material, and so forth) of the tubular welding wire 12 and the workpiece 18. The input devices 44 may also enable adjustment of the wire feeder 30 through the control circuitry 28. A display 46 may display information pertaining to the operational status of the FCAW-S welding system 10, arc consistency, weld quality, and/or weld parameters. The display 46 and input devices 44 may be used together to navigate menus and adjust weld parameters of the base unit 16. Indicators 48 may be used to alert the operator to conditions and the status of the welding system 10. For example, the indicators 48 may be used to alert the operator of low electrode supply 32 or other conditions of the base unit 16.

As mentioned above, by controlling the composition of the tubular welding wire 12, certain chemical and mechanical properties of the resulting weld deposit may be varied.

For example, as set forth in detail below, the tubular welding wire 12 may include components to react with and remove undesired species (e.g., oxygen and/or nitrogen) from the weld environment. In certain embodiments, the tubular welding wire 12 may further provide alloying components (e.g., copper, molybdenum, silicon, carbon, or other suitable alloying components) to the weld pool, affecting the mechanical properties, such as the strength and/or toughness of the weld deposit. Furthermore, certain components of the tubular welding wire 12 may also provide shielding atmosphere near the arc 22, affect the transfer properties of the arc 22, clean the surface of the workpiece 18, and so forth.

With the foregoing in mind, a cross-section 50 of an embodiment of the presently disclosed tubular welding wire 12 is illustrated in FIG. 2. The illustrated tubular welding wire 12 includes a metallic sheath 52 encapsulating a granular or powdered core 54. The metallic sheath 52 may include any suitable metal or alloy (e.g., iron, high-carbon steel, low-carbon steel, manganese, nickel, or other suitable metal or alloy). For example, in certain embodiments, the metallic sheath 52 may include 80%, 90%, 95%, 98%, or 100% iron or steel. It should be appreciated that since the metallic sheath 52 may generally provide at least a portion of the filler metal for the weld, the composition of the metallic sheath 52 may affect the composition of the resulting weld. For example, in certain embodiments, the metallic sheath 52 may include less than approximately 0.1%, less than approximately 0.05%, between approximately 0.01% and 0.05%, or between approximately 0.01% and 0.03% carbon by weight. Additionally, in certain embodiments, the metallic sheath 52 may include less than approximately 0.5%, less than approximately 0.3%, or between approximately 0.2% and 0.4% manganese by weight. In certain embodiments, manganese and carbon may be the primary alloying elements of the metallic sheath 52, with the balance of the metallic sheath 52 being composed of iron and trace metals. By specific example, in certain embodiments, the sheath 52 may have a chemical composition of approximately 85.7% by weight of iron, 0.26% by weight of manganese, and 0.022% by weight of carbon relative to the total weight of the tubular welding wire 12.

The granular core 54 of the illustrated tubular welding wire 50 may generally be a compacted powder with a composition that, as discussed in detail below, includes various components that each may serve at least one role (e.g., as a shielding gas agents, alloying agents, etc.) during the welding process. Further, the components of the granular core 54 may be homogenously or non-homogenously (e.g., in clumps or clusters 56) disposed within the granular core 54. In certain embodiments, the granular core 54 may be between approximately 11% to 24%, approximately 13% to 15%, or approximately 14% of the total weight of the tubular welding wire 50. For certain embodiments of the disclosed tubular welding wire, the granular core 54 may account for less than 15% of the total weight of the tubular welding wire 50, which may be significantly less than the cores of other welding wires. For such embodiments, the relatively low increases the capability of the tubular welding wire 50 to produce a quality weld across the open root.

Tables 1 and 2, set forth below, include various embodiments of the tubular welding wire 12 illustrated in FIGS. 1 and 2. More specifically, Table 1 includes a non-limiting list of components of nine example formulations (e.g., E1-E9) of the granular core 54 for the presently disclosed tubular welding wire 12. For the embodiments E1-E4 and E7 of Table 1, the metallic sheath 52 may account for approximately 86% of the weight of the tubular welding wire 12, while the remaining approximately 14% of the weight of the tubular welding wire 12 may be contributed by the granular core 54. For the embodiments E5, E6, E8, and E9 of Table 1, granular core 54 may contribute 11%, 13.5%, 15%, and 24% of the weight of the tubular welding wire 12, respectively. Table 2 includes a computed chemical breakdown of the granular core 54, based on the components indicated in Table 1, for each of the embodiments of the tubular welding wire 12 presented in Table 1. Further, Table 3 includes chemical analyses for two example weld deposits formed using the disclosed tubular welding wires 50.

TABLE 1

Example formulations for the granular core 54 for embodiments E1-E9 of the tubular welding wire 12. Values are in weight percent relative to the total weight of the granular core 54 (% core) and in weight percent relative to the total weight of the tubular welding wire 50 (% wire).

| Role | Granular Core Components | E1 % core | E1 % wire | E2 % core | E2 % wire | E3 % core | E3 % wire | E4 % core | E4 % wire | E5 % core | E5 % wire |
|---|---|---|---|---|---|---|---|---|---|---|---|
| Shielding gas agent | calcium carbonate | 3.9 | 0.55 | 3.9 | 0.55 | 3.9 | 0.55 | 3.9 | 0.56 | 3.9 | 0.43 |
| Alloying or filler agents | nickel metal powder | 3.2 | 0.45 | 3.2 | 0.45 | 3.2 | 0.45 | 3.2 | 0.46 | 3.2 | 0.35 |
| | iron powder | 0.0 | 0.00 | 0.0 | 0.00 | 0 | 0.00 | 0.0 | 0.00 | 0.0 | 0.00 |
| | manganese metal powder | 9.7 | 1.36 | 9.7 | 1.36 | 9.7 | 1.38 | 9.7 | 1.39 | 9.7 | 1.07 |
| Deoxidizing/ Denitrifying Agents | aluminum metal powder | 24.7 | 3.46 | 24.2 | 3.39 | 24.3 | 3.45 | 24.3 | 3.47 | 24.3 | 2.67 |
| | agglomerated Li/Mn/Fe oxides | 4.3 | 0.60 | 4.3 | 0.60 | 4.3 | 0.61 | 4.3 | 0.61 | 4.3 | 0.47 |
| | agglomerated Li/Si/Fe oxides | 37.2 | 5.21 | 37.7 | 5.28 | 37.2 | 5.28 | 37.2 | 5.32 | 37.2 | 4.09 |
| Slag forming agents | rutile sand | 0.0 | 0.00 | 0.0 | 0.00 | 0.4 | 0.06 | 0.4 | 0.06 | 0.4 | 0.04 |
| | iron oxide | 2.5 | 0.35 | 2.5 | 0.35 | 0.0 | 0.00 | 0.0 | 0.00 | 0.0 | 0.00 |
| | manganous oxide | 0.0 | 0.00 | 0.0 | 0.00 | 2.5 | 0.36 | 2.5 | 0.36 | 2.5 | 0.28 |
| | silica sand | 0.0 | 0.00 | 0.0 | 0.00 | 0 | 0.00 | 0.0 | 0.00 | 9.5 | 1.05 |
| | silicon dioxide (fine) | 14.5 | 2.03 | 14.5 | 2.03 | 14.5 | 2.06 | 14.5 | 2.07 | 5.0 | 0.55 |
| | SUM | 100 | 14 | 100 | 14 | 100 | 14.2 | 100 | 14.3 | 100 | 11 |

TABLE 1-continued

Example formulations for the granular core 54 for embodiments E1-E9 of the tubular welding wire 12.
Values are in weight percent relative to the total weight of the granular core 54 (% core)
and in weight percent relative to the total weight of the tubular welding wire 50 (% wire).

| Role | Granular Core Components | E6 % core | E6 % wire | E7 % core | E7 % wire | E8 % core | E8 % wire | E9 % core | E9 % wire |
|---|---|---|---|---|---|---|---|---|---|
| Shielding gas agent | calcium carbonate | 3.9 | 0.53 | 3.9 | 0.55 | 3.9 | 0.59 | 2.3 | 0.55 |
| Alloying or filler agents | nickel metal powder | 3.2 | 0.43 | 3.2 | 0.45 | 3.2 | 0.48 | 1.8 | 0.43 |
| | iron powder | 0.0 | 0.00 | 0.0 | 0.00 | 0.0 | 0.00 | 41.9 | 10.06 |
| | manganese metal powder | 9.7 | 1.31 | 9.7 | 1.36 | 9.7 | 1.46 | 5.6 | 1.34 |
| Deoxidizing/ Denitrifying Agents | aluminum metal powder | 24.3 | 3.28 | 24.3 | 3.40 | 24.3 | 3.65 | 14.2 | 3.41 |
| | agglomerated Li/Mn/Fe oxides | 4.3 | 0.58 | 4.3 | 0.60 | 4.3 | 0.65 | 1.4 | 0.34 |
| | agglomerated Li/Si/Fe oxides | 37.2 | 5.02 | 37.2 | 5.21 | 37.2 | 5.58 | 21.7 | 5.21 |
| Slag forming agents | rutile sand | 0.4 | 0.05 | 0.4 | 0.06 | 0.4 | 0.06 | 0.2 | 0.05 |
| | iron oxide | 0.0 | 0.00 | 0.0 | 0.00 | 0.0 | 0.00 | 0.0 | 0.00 |
| | manganous oxide | 2.5 | 0.34 | 2.5 | 0.35 | 2.5 | 0.38 | 2.5 | 0.60 |
| | silica sand | 9.5 | 1.28 | 9.5 | 1.33 | 9.5 | 1.43 | 5.5 | 1.32 |
| | silicon dioxide (fine) | 5.0 | 0.68 | 5.0 | 0.70 | 5.0 | 0.75 | 2.9 | 0.70 |
| | SUM | 100 | 13.5 | 100 | 14 | 100 | 15 | 100 | 24 |

As set forth in Table 1, embodiments E1-E9 include a granular core 54 having various components that each may serve at least one role as shielding gas agents, alloying agents, and deoxidizing/denitrifying agents during the welding process. It should be appreciated that, while a particular component may be designated as a particular agent in Table 1, the component may also serve other roles during the welding process. For example, as set forth in greater detail below, aluminum may serve as denitrifying agent (e.g., to react with and remove nitrogen from the weld pool), but may also, to some degree, act as deoxidizing agent (e.g., to react with and remove oxygen from the weld pool) and an alloying agent (e.g., to affect the mechanical properties of the weld deposit).

As set forth in Table 1, the granular core 54 may include between approximately 0.4% and approximately 0.6% calcium carbonate as a shielding gas agent by weight of the tubular welding wire 50. As such, at least a portion of the calcium carbonate may decompose under arc conditions to generate $CO_2$ shielding gas. Accordingly, embodiments E1-E9 may be used as FCAW-S welding wires without the use of an external shielding gas, which may reduce the complexity and cost of the welding system 10 as well as the welding operation. However, it should be appreciated that embodiments E1-E9 may also be used in conjunction with an external shielding gas (e.g., in a GMAW system) without deteriorating the quality of the weld deposit.

As set forth in Table 1, the granular core 54 may include between approximately 1% and approximately 12% alloying and filler agents (e.g., nickel, manganese, and iron metal powders) by weight of the tubular welding wire 50. In particular, embodiments E1-E9 include between 1% and 2% by weight nickel and manganese powders, while embodiment E9 includes an additional 10% by weight iron powder as filler. It may be appreciated that at least a portion of the alloying and filler agents may be incorporated into the weld deposit during the welding operation, affecting the mechanical properties (e.g., strength, ductility, and/or toughness) of the weld deposit. However, as mentioned above, a portion of the aluminum powder may also be incorporated into the weld deposit to affect the resulting mechanical properties.

As set forth in Table 1, the granular core 54 may include between approximately 7% and approximately 10% deoxidizing/denitrifying agents (e.g., aluminum powder, Li/Mn/Fe agglomerate, and Li/Si/Fe agglomerate) by weight of the tubular welding wire 50. The chemical composition of the Li/Mn/Fe and the Li/Si/Fe agglomerates are discussed in detail below. As mentioned, deoxidizing/denitrifying agents react with and remove nitrogen and/or oxygen from the weld pool to generally reduce weld porosity and embrittlement. However, as mentioned above, aluminum may also serve a role as, for example, an alloying agent. Similarly, other components of the agglomerates (e.g., sodium compounds, potassium compounds, lithium compounds) may also serve to stabilize the arc during the welding process.

In certain embodiments, increasing the lithium content of the granular core 54 may enable the aluminum content of the granular core 54 to be decreased without substantially affecting the capability of the core to limit the nitrogen and/or oxygen incorporation into the weld. Additionally, in such circumstances, reducing the aluminum in the weld pool, may strengthen the resulting weld deposit. Additionally, in certain embodiments, the tubular welding wire 50 may include between approximately 3% to approximately 4%, or between approximately 0.9% to approximately 1.3% aluminum by weight of the tubular welding wire 50. Further, lithium fluoride and lithium oxide (e.g., from the Li/Mn/Fe and the Li/Si/Fe agglomerates) may desirably lower the melting point when forming an alumina base slag. Additionally, in certain embodiments, lithium oxide alone may account for greater than approximately 0.4%, greater than 0.8%, or greater than 1% of the tubular welding wire 50 by weight.

Further, as set forth in Table 1, the granular core 54 may include between approximately 1.8% and approximately 2.8% slag forming agents (e.g., rutile sand, iron oxide, manganous oxide, silica sand, and/or silicon dioxide) by weight of the tubular welding wire 50. It may be appreciated that certain slag forming components may affect, among other things, the viscosity of the weld pool. As used herein, glassy slag promoter may denote one or more components of the tubular welding wire 50 may promote a lower melting point, glassy slag that does not deform the back bead during the welding operation. In other words, the use of glassy slag promoters, like $SiO_2$, may provide a continuously reinforced, substantially uniform weld bead, and may allow the slag to flow and congeal without substantial deformation (e.g., indentation) and/or weld fusion interference to the workpiece (e.g., avoiding cold-lapping). For example, silicon dioxide ($SiO_2$) (e.g., from one or more of silica sand, the fine silicon dioxide, and/or the agglomerates, as set forth in Table 1) may promote a lower melting point, glassy slag that fluxes and congeals without interfering with the weld fusion interface. As such, in certain embodiments, the glassy slag promoter in a tubular welding wire 50 is silicon dioxide. It may be appreciated that other oxides (e.g., titanium dioxide, a borate, sodium oxide) are believed to also be useful for promoting a glassy slag. Accordingly, in other embodiments, the glassy slag promoter may be a mixture of two or more oxide species (e.g., silicon dioxide and sodium oxide).

In certain embodiments, the glassy slag promoter (e.g., $SiO_2$, titanium dioxide, a borate, sodium oxide, or another suitable oxide) may be configured to increase the capability of the FCAW-S system 10 to perform open root welds (e.g., without the use of a backing) via this positive reinforcement of the weld pool. For certain embodiments of the tubular welding wire 50, the granular core 54 may include greater than approximately 1.6%, greater than approximately 1.8%, or greater than approximately 2% glassy slag promoter by weight of the tubular welding wire 50. Indeed, certain embodiments of the presently disclosed tubular welding wire 50 may include a substantially higher (e.g., 5 to 10 times higher) glassy slag promoter content (e.g., $SiO_2$ content) than other self-shielding welding wires. As set forth in Table 2, in certain embodiments, the formed granular core 54 may include a glassy slag promoter (e.g., $SiO_2$) in amounts greater than approximately 1%, greater than approximately 2%, greater than approximately 3%, or between approximately 2.5% and approximately 3.5% relative to the weight of the tubular welding wire 50.

Furthermore, as mentioned above, in certain embodiments, one or more components may be prepared and included in the granular core 54 as agglomerates e.g., sintered and/or formed into frits). It should be noted that the term "agglomerate" or "frit," as used herein, refers to a mixture of compounds that have been fired or heated in a calciner or oven such that the components of the mixture are in intimate contact with one another. It should be appreciated that the agglomerate or frit may have subtly or substantially different chemical and/or physical properties than the individual components of the mixture used to form the agglomerate. For example, an agglomerate may generally be better suited for the weld environment (e.g., drier and/or better powder flow) than a non-agglomerated form of the same component.

With the foregoing in mind, as set forth in Table 1, embodiments E1-E9 each incorporate two agglomerates, namely the Li/Si/Fe agglomerate and Li/Mn/Fe agglomerate. For example, in certain embodiments, the Li/Si/Fe agglomerate may have a chemical composition that includes approximately 18.7% lithium oxide, approximately 61.6% iron oxides, approximately 0.2% sodium oxide and approximately 19.5% silicon dioxide. Further, the Li/Si/Fe agglomerate may be formed by heating a mixture including approximately 16.3% water, approximately 30% iron oxides, approximately 1.3% sodium silicate, approximately 12.3% silica, approximately 10.1% iron oxide (e.g., purified $Fe_2O_3$), approximately 30% lithium carbonate, to approximately 1700° F. for approximately 2 hours.

In certain embodiments, the Li/Mn/Fe agglomerate may have a chemical composition that includes approximately 10.85% lithium oxide, approximately 24.84% lithium fluoride, approximately 53.1% iron oxides, approximately 0.29% sodium oxide, approximately 1.22% silicon dioxide, 0.31% alumina, and 9.39% manganous oxide. Further, the Li/Mn/Fe agglomerate may be formed by first forming an intermediate agglomerate by heating a mixture including approximately 16.44% water, approximately 1.32% sodium silicate, approximately 48.29% iron oxide (e.g., purified $Fe_2O_3$), approximately 24.5% lithium carbonate, and approximately 9.45% manganous oxide to approximately 1700° F. for approximately 2 hours. The Li/Mn/Fe agglomerate may then be formed by heating a mixture including approximately 73.8% of the intermediate agglomerate, approximately 24.6% purified (e.g., precipitated grade) lithium fluoride, and approximately 1.6% sodium silicate to approximately 1150° F. for approximately 2 hours. Accordingly, the Li/Mn/Fe agglomerate may be considered a "double fired" agglomerate, while the Li/Si/Fe agglomerate may be considered a "single fired" agglomerate.

TABLE 2

Calculated chemical breakdown of the example formulations E1-E9 of the granular core embodiments set forth in Table 1. Values are in weight percent relative to the total weight of the tubular welding wire 50. Note that the breakdown indicates the primary constituents of the granular core and that other trace elements or compounds may be present in the granular core 54.

| | Formula | | | | | | | | |
|---|---|---|---|---|---|---|---|---|---|
| | E1 | E2 | E3 | E4 | E5 | E6 | E7 | E8 | E9 |
| Al | 3.441 | 3.371 | 3.451 | 3.475 | 2.673 | 3.281 | 3.645 | 3.402 | 3.408 |
| $Al_2O_3$ | 0.010 | 0.010 | 0.005 | 0.005 | 0.004 | 0.005 | 0.005 | 0.005 | 0.005 |
| $CaCo_3$ | 0.508 | 0.508 | 0.532 | 0.536 | 0.412 | 0.505 | 0.525 | 0.561 | 0.530 |
| Fe | 0.015 | 0.015 | 0.000 | 0.000 | 0.000 | 0.000 | 0.000 | 0.000 | 9.709 |
| FeO | 3.881 | 3.924 | 3.580 | 3.605 | 2.773 | 3.403 | 3.529 | 3.781 | 3.760 |
| $Li_2O$ | 1.039 | 1.052 | 1.054 | 1.061 | 0.817 | 1.002 | 1.039 | 1.113 | 1.039 |
| LiF | 0.150 | 0.150 | 0.152 | 0.153 | 0.117 | 0.144 | 0.150 | 0.160 | 0.149 |
| Mn | 1.346 | 1.346 | 1.377 | 1.387 | 1.067 | 1.310 | 1.358 | 1.455 | 1.404 |
| MnO | 0.057 | 0.057 | 0.412 | 0.415 | 0.319 | 0.392 | 0.407 | 0.436 | 0.392 |
| $Na_2O$ | 0.012 | 0.012 | 0.012 | 0.012 | 0.010 | 0.012 | 0.012 | 0.013 | 0.012 |
| Ni | 0.446 | 0.446 | 0.454 | 0.458 | 0.352 | 0.432 | 0.448 | 0.480 | 0.432 |
| Si | 0.014 | 0.014 | 0.000 | 0.000 | 0.000 | 0.000 | 0.000 | 0.000 | 0.000 |
| $SiO_2$ | 3.041 | 3.054 | 3.112 | 3.134 | 2.411 | 2.959 | 3.068 | 3.288 | 3.105 |
| $TiO_2$ | 0.001 | 0.001 | 0.055 | 0.056 | 0.043 | 0.053 | 0.055 | 0.059 | 0.047 |

Lithium sources of the granular core 54 indicated in Table 1 include the Li/Si/Fe agglomerate and the Li/Mn/Fe agglomerate; however, in other embodiments, lithium fluoride or lithium oxide may also be present in the granular core 54 in a non-agglomerated form. In certain embodiments, as indicated in Table 2, the granular core 54 may include greater than 0.4%, greater than 0.8%, or between approximately 1% and approximately 2% lithium compounds (e.g., lithium oxide and lithium fluoride from the agglomerates) by weight of the tubular welding wire 50. The lithium sources may reduce the amount of nitrogen that diffuses or migrates into the weld pool, decreasing the porosity. The lithium sources may be configured to form a nitride at the surface of the weld pool, decrease the nitrogen within the weld pool, and/or decrease the nitrogen available to bond to the aluminum sources. In some embodiments, increasing the weight percent of the lithium sources relative to the total weight of the granular core 54 may enable the weight percent of the aluminum sources to decrease in the resulting weld deposit. Further, as mentioned above, a lower weight percent of aluminum may increase the ductility and toughness of the weld.

The FCAW-S system 10 provided with the self-shielding tubular welding wire embodiments E1-E9 set forth above enables an operator to readily perform an open root pass weld. That is, at least the aluminum and lithium sources within the granular core 54 reduce the porosity and embrittlement of the weld by binding with the oxygen and nitrogen. It may be appreciated that, in certain embodiments, limiting the oxygen in the weld pool may reduce the viscosity and increases the flow of the weld pool, which may enable the operator to readily manipulate the weld pool to obtain an acceptable root pass weld bead. In certain embodiments, the quantity of $SiO_2$ (or another suitable glassy slag promoter) may produce a glassy slag (e.g., providing greater reinforcement) in the weld pool. In other words, the use of one or more glassy slag promoters (e.g., $SiO_2$) may provide support for the weld pool during open root welding operation to reduce undesirable windowing (e.g., enlarged opening in the root region) and spearing (e.g., feeding wire through the root without a continuous arc).

TABLE 3

Chemical analysis of two example weld deposits formed using the disclosed tubular welding wire 50. Weld deposits were formed using the following parameters: DCEP; Wire Feed Speed: 127 inches per minute; Electrical Stickout: 0.5 in.; No external shielding gas. N/A denotes measurements that are not presently available.

| Element | Weld Deposit A | Weld Deposit B |
| --- | --- | --- |
| Carbon | 0.740 | 0.082 |
| Manganese | 1.517 | 1.456 |
| Phosphorus | 0.009 | 0.010 |
| Sulfur | 0.012 | 0.014 |
| Silicon | 0.637 | 0.555 |
| Copper | 0.039 | 0.055 |
| Chromium | 0.032 | 0.048 |
| Vanadium | 0.008 | 0.010 |
| Nickel | 0.495 | 0.462 |
| Molybdenum | 0.006 | 0.012 |
| Aluminum | 1.224 | 1.087 |
| Titanium | 0.001 | 0.001 |
| Niobium | 0.004 | 0.009 |
| Cobolt | 0.002 | 0.004 |
| Boron | 0.001 | 0.002 |
| Tungsten | 0.005 | 0.008 |
| Tin | 0.007 | 0.008 |
| Lead | N/A | 0.001 |
| Zirconium | 0.001 | 0.001 |
| Antimony | 0.002 | 0.007 |
| Arsenic | 0.003 | 0.005 |

Figure 3:
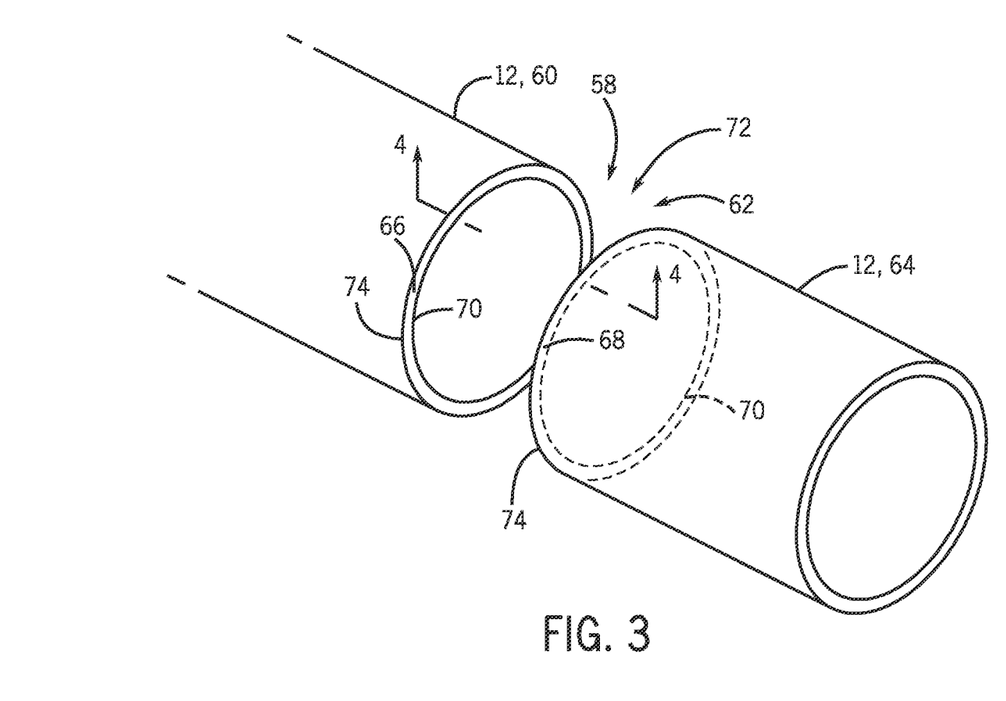
FIG. 3 is a schematic diagram of an embodiment of a pipe joint, in accordance with aspects of the present disclosure.

FIG. 3 illustrates an embodiment of workpieces 18 that may be joined by the FCAW-S system 10 and tubular welding wire 12 described above. The workpieces 18 of FIG. 3 include a first end 58 of a first pipe section 60 to be welded to a second end 62 of a second pipe section 64. A first face 66 of the first end 58 is to be welded to an opposing second face 68 of the second end 62. In some embodiments as discussed below, the first face 66 and/or the second face 68 may be beveled, notched, or grooved to enable the welding torch 14 to readily join the root faces 70 (e.g., inner surfaces) of the first and second pipe sections 60, 64. The FCAW-S system 10 may be configured to provide a substantially uniform root weld bead along the entire joint 72 between the first and second pipe sections 60, 64. In some embodiments, the outer diameters 74 of the first and second pipe sections 60, 64 may also be welded together, such that the outer diameter 74 of the pipe is substantially uniform across the joint 72 between the first and second pipe sections 60, 64.

Figure 4:
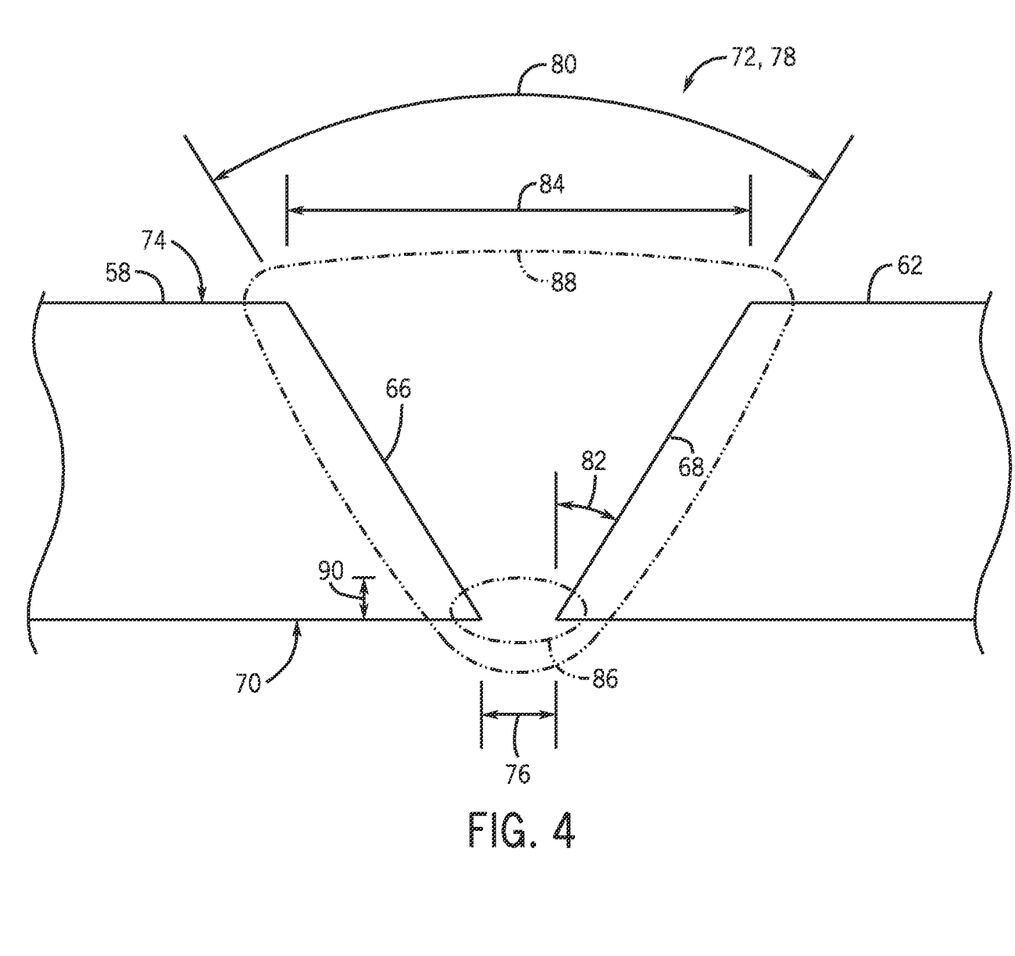
FIG. 4 is a schematic diagram of an embodiment of a V-groove joint, in accordance with aspects of the present disclosure.

FIG. 4 illustrates a cross-section of the joint 72 of FIG. 3 along lines 4-4 between the first and second ends 58, 62. The first and second ends 58, 62 may be positioned with a root opening 76 between the root faces 70. The joint 72 of FIG. 4 illustrates a V-groove joint 78 where the first and second faces 66, 68 taper towards the root faces 70, forming a joint angle 80 between the opposing faces 66, 68. In some embodiments, the taper angle 82 for the first and second faces 66, 68 is the same, however the taper angle 82 may differ in other embodiments. The outer opening 84 is greater than the root opening 76 to increase the accessibility to weld the root faces 70. In some embodiments, the FCAW-S system 10 and tubular welding wire 12 are used to form a root pass weld 86 joining the root faces 70 of the first and second ends 58, 62. The root pass weld forms 86 a foundation that may support filler metal 88 provided by subsequent welds. The FCAW-S system 10 and tubular welding wire 12 may be configured to perform root pass welding without a backing material to support the root pass weld 86 across the root opening 76. In some embodiments, the bead profile 90 using the FCAW-S system 10 may be less than the bead profile using a stick welding system.

Figure 5:
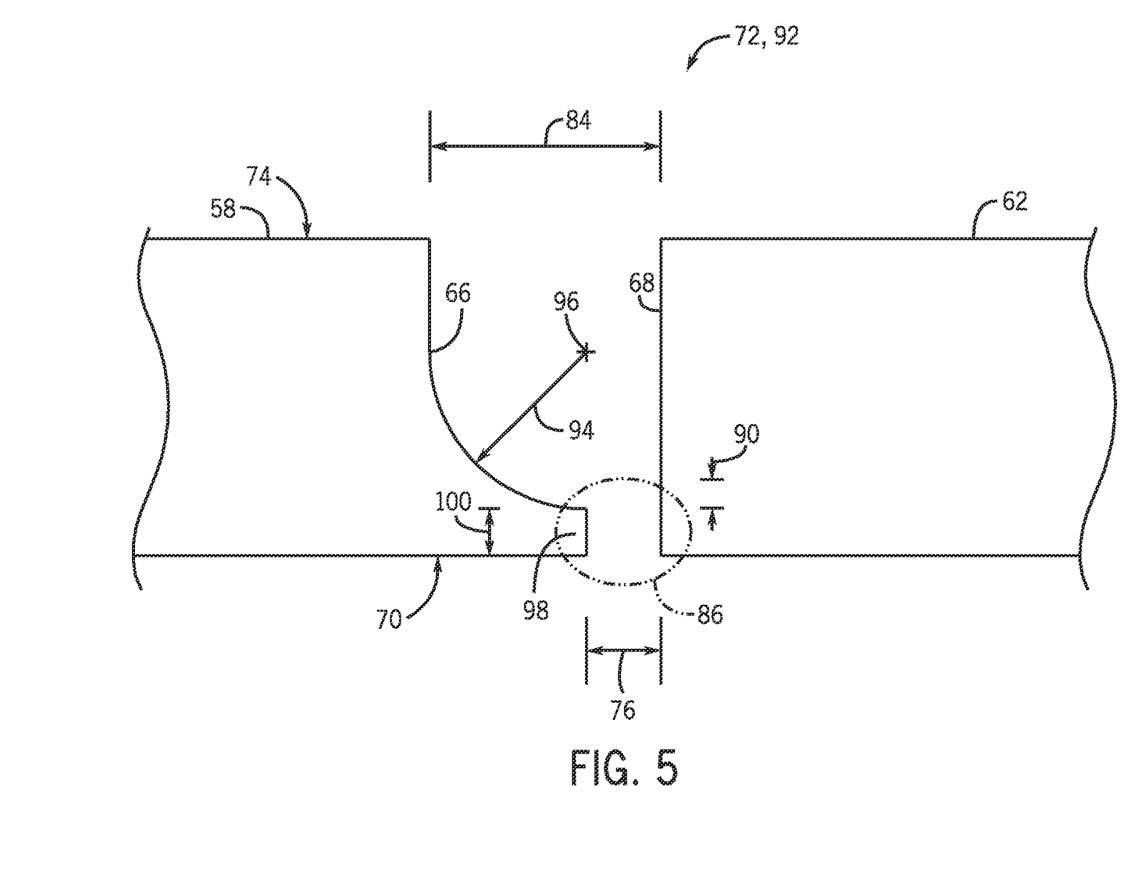
FIG. 5 is a schematic diagram of an embodiment of a J-groove joint, in accordance with aspects of the present disclosure.

FIG. 5 illustrates a cross-section of the joint 72 of FIG. 3 along lines 4-4 between the first and second ends 58, 62. The joint 72 of FIG. 4 illustrates a J-groove joint 92 where one of the first or second faces 66, 68 has a curved face and the other has a square face. In some embodiments, the curved face has a radius 94 and a center 96. The curved face (e.g., first face 66) may have a ledge 98 of depth 100 separated by the root opening 76 from the opposing face (e.g., second face 68). The outer opening 84 greater than the root opening 74 increases the accessibility to weld the root faces 70. Other presently contemplated joints 72 with root openings 76 include, but are not limited to, square groove joints, beveled butt joints (e.g., one tapered face, one square face), and U-groove joints (e.g., two curved faces). The granular core 54 of the tubular welding wire 12 described above enables the chemistry of the weld pool to be conducive to performing root pass welds 86 for a variety of joints 72.

Figure 6:
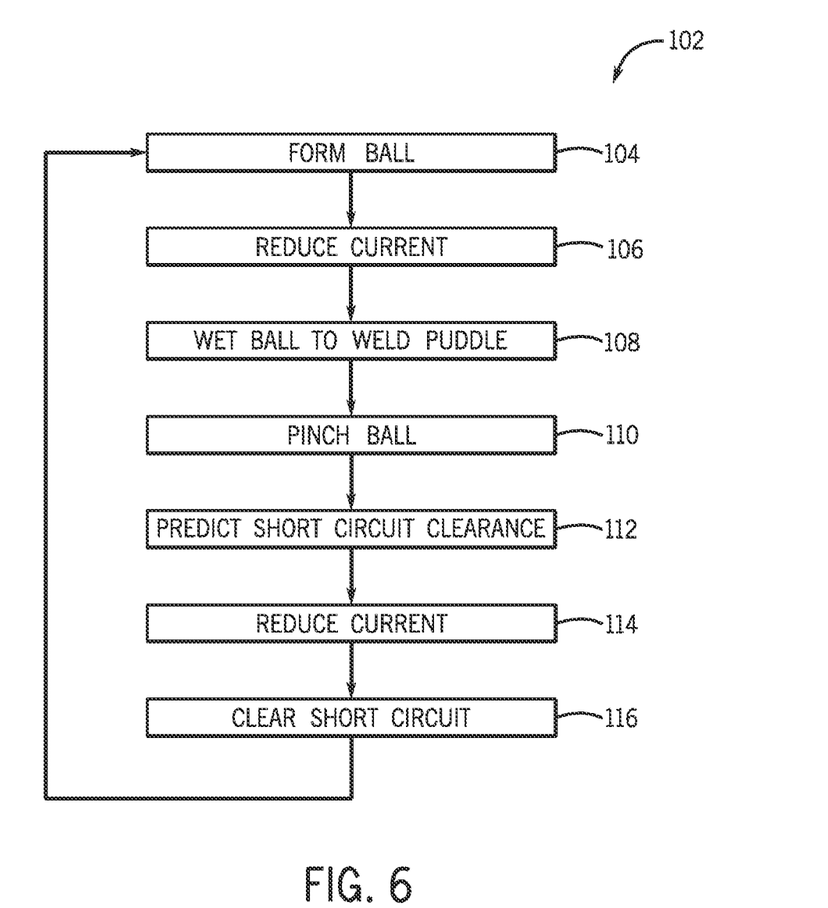
FIG. 6 is a flow chart of an embodiment for short-circuit welding a self-shielded tubular welding wire, in accordance with aspects of the present disclosure.

The flowchart of FIG. 6 illustrates a method 102 of performing the root pass welds 86 with the tubular welding wire 12. The method 102 is a short circuit electrode transfer method configured to transfer droplets to a weld pool to reinforce the weld pool and produce a root pass weld across a root opening. As described above, the power supply of the FCAW-S system 10 is configured to supply power to the tubular welding wire 12 (e.g., electrode) at the torch 14. The control circuitry 28 controls the direct current power supplied by the power supply through adjusting the current and voltage to affect the deposition of weld metal. It is noted that the method 102 illustrated in FIG. 6 provides significant beneficial effects when the polarity of the FCAW-S system 10 is DC electrode positive (DCEP). However, other polarities may also benefit from the method 102 illustrated in FIG. 6. The FCAW-S system 10 may supply power to the torch 14 in a series of distinct phases. In block 104, the FCAW-S system 10 forms a molten ball of the electrode. The molten ball is formed through a relatively high current and voltage arc through the end of the ball that forms an arc 22 with the workpiece 18. The high current is configured to provide sufficient arc force to push the weld pool into the root opening. Pushing the weld pool into the root opening enables the FCAW-S to achieve adequate bead reinforcement on the internal root face. When forming the molten ball at block 104, the granular core 54 of the tubular welding wire 12 reacts with the ambient environment to produce the shielding gas around the ball and weld pool. As the electrode warms, the molten ball may become larger and approach the workpiece 18 to create a short-circuit. The wire feeder 30 also feeds the wire 12 towards the workpiece 18. At block 106, the control circuitry 28 is configured to reduce the amplitude and adjust the duration of the current applied to adjust the size of the molten ball. The size of the molten ball is related to the transfer mode. The control circuitry 28 is configured to reduce the current prior to the molten ball contacting the workpiece 18 to create a short circuit. For example, the control circuitry 28 may initially form the molten ball with a first current level and reduce the current level in stages as the molten ball enlarges, such as to a second and third current level prior to the short circuit. The low current level prior to the short circuit retains the molten ball on the electrode and aids wetting of the molten ball into the weld pool at block 108. When the molten ball is wetted to the weld pool, a short circuit is formed between the electrode and the workpiece 18. Compounds of the granular core 54 in the weld pool may react with elements (e.g., oxygen, nitrogen, impurities) in the weld pool and form slag atop the weld pool. The silicon dioxide of the granular core 54 reinforces the weld pool to aid the formation of the weld across the root opening 76.

At block 110, the control circuitry 28 is configured to increase the current through the electrode to pinch the molten ball into the weld pool with a magnetic field. As the current through the electrode coupled to the weld pool increases, the electrode may narrow and affect the voltage through the electrode. At block 112, the control circuitry 28 predicts the onset of clearing the short circuit by detecting the change in voltage, current, or some mathematical function of both voltage and current. At block 114, the control circuitry 28 rapidly decreases the current prior to clearing the short circuit at block 116. By reducing the current prior to clearing the short circuit, the control circuitry 28 reduces the spatter caused by the arc 22 immediately following the clearance. Reducing spatter improves the surface quality of the weld groove and improves the quality of subsequent weld passes. After the short circuit clears, the control circuitry 28 may repeat the method 102 to form subsequent molten balls of the tubular welding wire 12 and a series of weld beads along the joint 72. Throughout the method 102, the control circuitry 28 is configured to control the feed rate of the tubular welding wire 12 to substantially maintain the desired stick-out for the weld.

Figure 7:
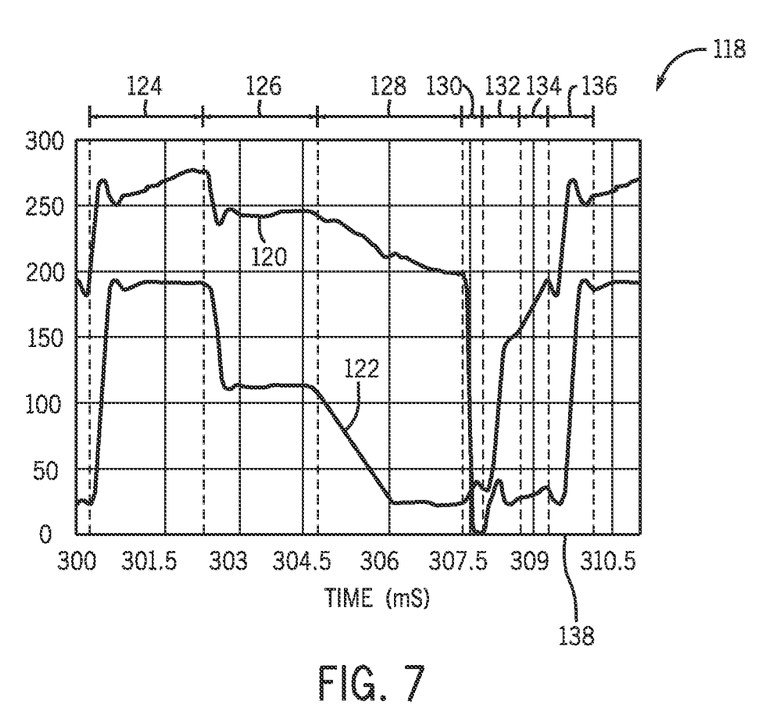
FIG. 7 is a chart of a short-circuit welding cycle, in accordance with aspects of the present disclosure.

FIG. 7 illustrates a chart 118 of phases of the current and voltage supplied to electrode to form the root pass weld joint. The first curve 120 illustrates the weld voltage, and the second curve 122 illustrates the supplied current. During the ball phase 124, an arc having a relatively high voltage 120 and current 122 melts the tip of the electrode and forces the weld pool into the weld root. In the background phase 126 and pre-short phase 128, the control circuitry 28 reduces the voltage 120 and current 122 to retain the molten ball on the electrode and aids the wetting of the molten ball into the weld pool in the wetting phase 130. The duration of the ball phase 124, background phase 126, and pre-short phase 128 may be adjusted to allow the workpiece 18 to cool and the silicon dioxide of the granular core 54 from previously deposited molten balls to reinforce the weld pool across the root opening 76. The molten ball forms a short circuit with the workpiece when the molten ball contacts the weld pool in the wetting phase 130. The voltage 120 decreases to a low level during the short circuit. The control circuitry 28 is configured to increase the current 122 in the pinch phase 132 to create a magnetic field to pinch the electrode and separate the molten ball from the weld pool. In the prediction phase 134, the control circuitry 28 is configured to predict onset of the short circuit clearance after the current 122 reaches a certain level or a certain time has elapsed since the short circuit. In the clearance phase 136, the control circuitry 28 is configured to reduce the current 122 prior to the short circuit at time 138. As the short circuit clears, the voltage 120 increases and the control circuitry 28 decreases the current 122 to a low level before increasing the current 122 to enter the ball phase 124 of the next deposition cycle. The control circuitry 28 is configured to adjust the duration and amplitude of each phase of the deposition cycle to provide sufficient reinforcement of the weld pool with silicon dioxide and to reduce spatter. Spatter may affect the weld quality by inclusion of granular core components in subsequent welds.

Technical effects of the presently disclosed embodiments include a FCAW-S system 10 and a tubular welding wire 12 that readily enable open root pass welding. In certain embodiments, the self-shielding tubular welding wire 12 and FCAW-S deposition method enable open root pass welds that satisfy commercial standards (e.g., API 1104) for all positions on pipe joints. Further, in certain embodiments, the open root pass welds may be performed with or without backing to support the root opening. Moreover, as the tubular welding wire may be self-shielding, an external shielding gas supply is not needed to operate the FCAW-S system 10. This may reduce the weight, cost, complexity, or combinations thereof associated with the welding torch 14 and welding system 10. The self-shielding tubular welding wire 12 also enables a smaller welding torch 14 that may increase operator visibility while welding.

While only certain features of the present technique have been illustrated and described herein, many modifications and changes will occur to those skilled in the art. It is, therefore, to be understood that the appended claims are intended to cover all such modifications and changes as fall within the true spirit of the invention.

The invention claimed is:

1. A tubular welding wire comprising:
    a core and a sheath disposed around the core, wherein the core of the tubular welding wire comprises:
        a first agglomerate comprising lithium oxide, lithium fluoride, iron oxides, sodium oxide, and silicon dioxide; and
        a second agglomerate comprising lithium oxide, iron oxides, sodium oxide, silicon dioxide, and manganous oxide;
    wherein the tubular welding wire comprises greater than approximately 2.4% glassy slag promoter by weight.

2. The tubular welding wire of claim 1, wherein the tubular welding wire comprises between approximately 2.5% and approximately 3.3% glassy slag promoter by weight.

3. The tubular welding wire of claim 1, wherein the tubular welding wire comprises between approximately 2.9% and approximately 3.2% glassy slag promoter by weight.

4. The tubular welding wire of claim 1, wherein the glassy slag promoter comprises one or more of silicon dioxide, titanium dioxide, a borate, or sodium oxide.

5. The tubular welding wire of claim 1, wherein the glassy slag promoter is silicon dioxide.

6. The tubular welding wire of claim 1, wherein the glassy slag promoter is selected from the group consisting of: titanium dioxide, a borate, and sodium oxide.

7. The tubular welding wire of claim 1, wherein the tubular welding wire comprises between approximately 2.6% and approximately 3.7% aluminum powder by weight.

8. The tubular welding wire of claim 1, wherein the tubular welding wire comprises between approximately 3.2% and approximately 3.6% aluminum powder by weight.

9. The tubular welding wire of claim 1, wherein the tubular welding wire comprises between approximately 0.8% and approximately 1.3% lithium compounds by weight.

10. The tubular welding wire of claim 1, wherein the tubular welding wire comprises between approximately 1% and approximately 1.25% lithium compounds by weight.

11. The tubular welding wire of claim 1, wherein the tubular welding wire comprises one or more shielding gas agents configured to decompose to provide a shielding gas near a welding arc.

12. A method of manufacturing a welding electrode, comprising:
forming a first agglomerate by sintering a mixture comprising sodium silicate, iron oxide, and lithium carbonate to form an intermediate agglomerate, and then sintering a mixture comprising the intermediate agglomerate, lithium fluoride, and sodium silicate to form the first agglomerate, wherein the first agglomerate comprises lithium oxide, lithium fluoride, iron oxides, sodium oxide, silicon dioxide, and manganous oxide;
providing a granular core, wherein providing the granular core comprises mixing the first agglomerate with a glassy slag promoter; and
disposing the granular core within a metallic sheath to form the welding electrode, wherein the welding electrode comprises greater than approximately 2.4% glassy slag promoter by weight.

13. The method of claim 12, wherein the welding electrode comprises between approximately 2.6% and approximately 3.7% aluminum by weight and between approximately 0.8% and approximately 1.3% lithium compounds by weight.

14. The method of claim 12, comprising forming a second agglomerate by sintering a mixture comprising iron oxides, sodium silicate, silica, and lithium carbonate.

15. The method of claim 14, wherein providing the granular core comprises mixing the second agglomerate with the first agglomerate and the glassy slag promoter, wherein the second agglomerate comprises lithium oxide, iron oxides, sodium oxide and silicon dioxide.

16. The tubular welding wire of claim 1, wherein the at least one agglomerate further comprises lithium fluoride and manganous oxide.

17. A method of manufacturing a welding electrode, comprising:
sintering a mixture comprising iron oxides, sodium silicate, silica, and lithium carbonate to form a first agglomerate, wherein the first agglomerate comprises lithium oxide, iron oxides, sodium oxide and silicon dioxide;
providing a granular core, wherein providing the granular core comprises mixing the first agglomerate with a glassy slag promoter; and
disposing the granular core within a metallic sheath to form the welding electrode, wherein the welding electrode comprises greater than approximately 2.4% glassy slag promoter by weight.

18. The method of claim 17, comprising forming a second agglomerate by sintering a mixture comprising sodium silicate, iron oxide, and lithium carbonate to form an intermediate agglomerate, and then sintering a mixture comprising the intermediate agglomerate, lithium fluoride, and sodium silicate to form the second agglomerate.

19. The method of claim 18, wherein providing the granular core comprises mixing the second agglomerate with the first agglomerate and the glassy slag promoter, wherein the second agglomerate comprises lithium oxide, lithium fluoride, iron oxides, sodium oxide, silicon dioxide, and manganous oxide.

* * * * *